United States Patent [19]

Marneris

[11] Patent Number: 4,475,366
[45] Date of Patent: Oct. 9, 1984

[54] PROTECTIVE DEVICE FOR INSTRUMENTS MOUNTED ON AN INSTRUMENT PANEL

[76] Inventor: Michael Marneris, 2679 Brady Ct., Santa Clara, Calif. 95051

[21] Appl. No.: 268,841

[22] Filed: Jun. 1, 1981

[51] Int. Cl.³ .................. B60R 25/02; B64C 13/12; B64C 13/14; E05B 65/12

[52] U.S. Cl. ......................................... 70/258; 70/18; 70/54; 70/57; 70/183; 70/200; 70/212; 70/238; 70/461; 244/224; 180/90

[58] Field of Search ............... 70/258, 238, 237, 212, 70/200, 199, 54–56, 167, 168, 166, 164, 163, 211, 15, 18, 57, 183, 202, 203; 180/90; 244/224

[56] References Cited

U.S. PATENT DOCUMENTS

| | | | |
|---|---|---|---|
| 1,318,443 | 10/1919 | Gimperling | 70/238 X |
| 1,349,139 | 8/1920 | McDonald | 70/212 X |
| 1,361,108 | 12/1920 | Soleau | 70/18 |
| 3,583,519 | 6/1971 | Meyer et al. | 180/90 |
| 3,695,071 | 10/1972 | West | 70/18 X |
| 3,699,787 | 10/1972 | Corrado | 70/258 X |
| 3,895,507 | 7/1975 | Moy | 70/212 X |
| 3,898,823 | 8/1975 | Ludeman | 70/238 X |
| 4,008,580 | 2/1977 | Harrell | 70/237 X |
| 4,228,974 | 10/1980 | Yates | 70/167 X |
| 4,282,730 | 8/1981 | Lipschutz | 70/461 X |
| 4,285,221 | 8/1981 | Atchisson | 70/461 X |
| 4,299,361 | 11/1981 | Webb | 70/258 X |

FOREIGN PATENT DOCUMENTS

| | | | |
|---|---|---|---|
| 74801 | 10/1981 | Austria | 70/18 |
| 795045 | 9/1968 | Canada | 70/238 |
| 513471 | 2/1921 | France | 70/183 |
| 525704 | 6/1921 | France | 70/183 |
| 413366 | 4/1946 | Italy | 70/55 |
| 1591576 | 6/1981 | United Kingdom | 70/211 |

Primary Examiner—Robert L. Wolfe
Assistant Examiner—Carl F. Pietruszka
Attorney, Agent, or Firm—Robert W. Dilts

[57] ABSTRACT

A device for protecting the navigational instruments and radio equipment mounted on an instrument panel in the cockpit of an aircraft against theft. The device includes a protective cover mounted immediately adjacent the instrument panel and means for locking the potective cover to the control column of the aircraft in a manner such that the aircraft controls will not be damaged in the event that the protective cover is tampered with.

9 Claims, 8 Drawing Figures

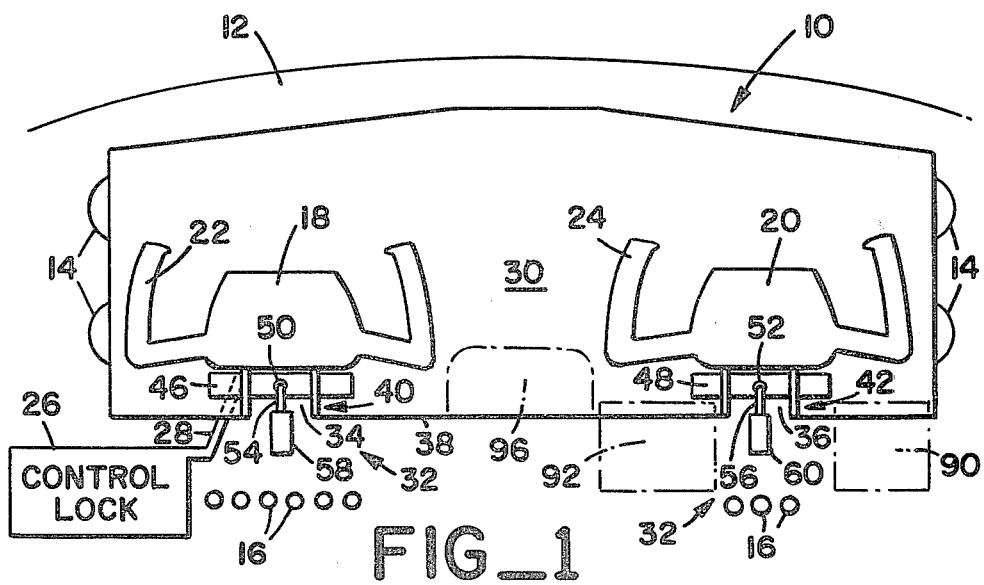
FIG_1
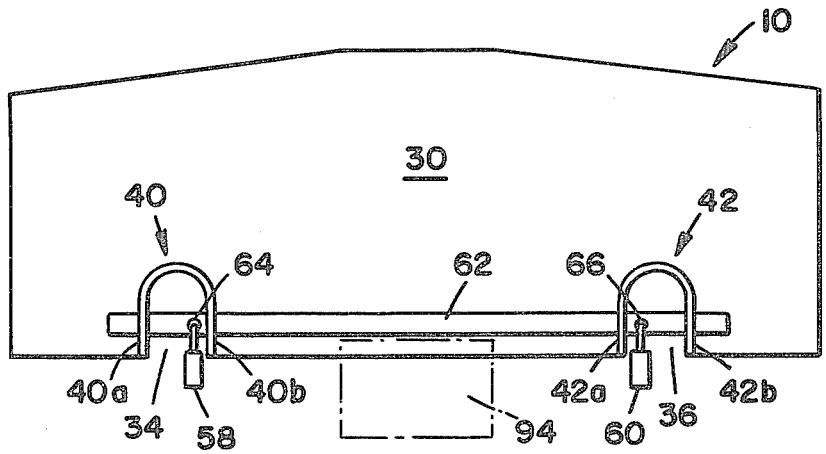
FIG_2
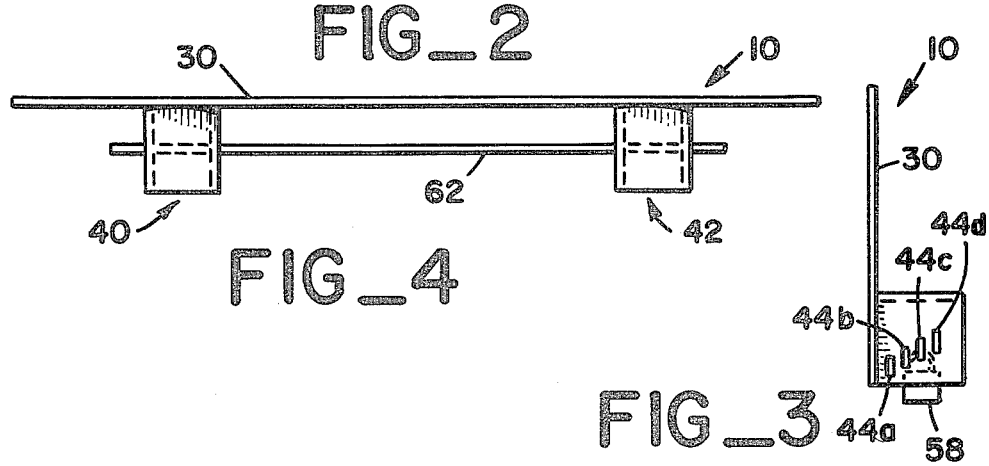
FIG_4
FIG_3

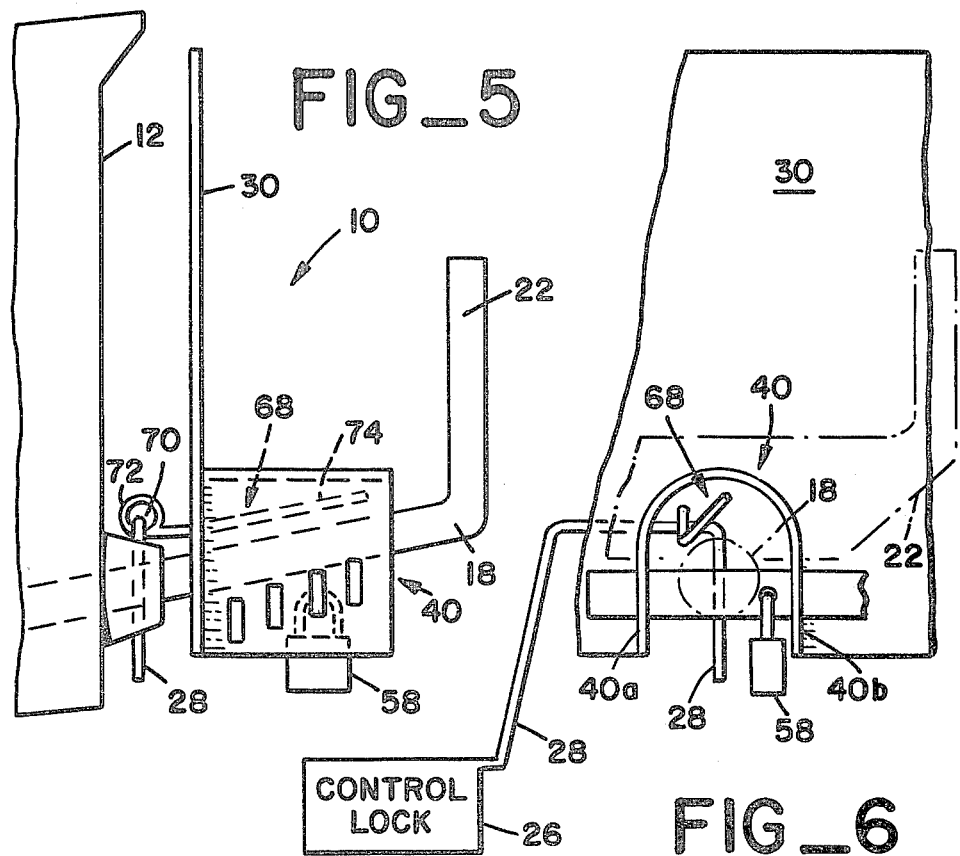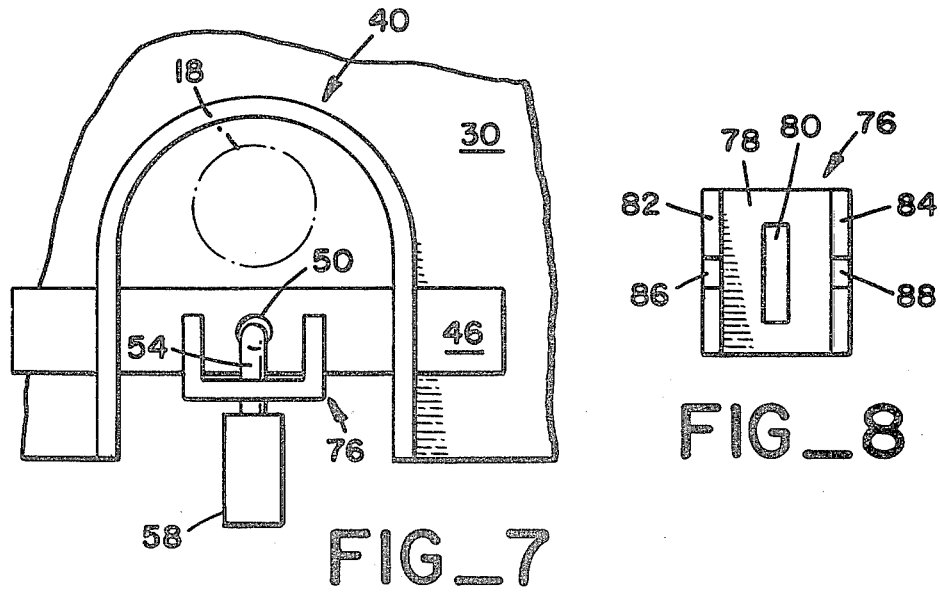

PROTECTIVE DEVICE FOR INSTRUMENTS MOUNTED ON AN INSTRUMENT PANEL

BACKGROUND OF THE INVENTION

This invention relates to protective devices and in particular to a protective device for instruments mounted on an instrument panel. More specifically, but without restriction to the particular use which is shown and described, this invention relates to a protective cover and lock means for the cover for protecting the radio and navigational instruments mounted on the instrument panel of an aircraft against theft.

Most privately owned light aircraft are provided with navigational instruments and radio equipment that are mounted for easy installation or removal for repair or replacement from the front of an instrument panel mounted within the airplane cockpit. Furthermore, most light aircraft are provided with cable operated controls including ailerons and elevators connected to a control column extending from the instrument panel which is turned by a wheel or a yoke. The elevators during flight are positioned by pushing foward or pulling back the control column in its longitudinal direction, and the ailerons are positioned by rotating the wheel.

Often such aircraft are not hangared, but merely tied down outside in a remote location on an airfield when not in use. When tied down in this manner, many small aircraft are provided with a control lock or lock pin under or near the instrument panel that drops through the control column to lock it into position to prevent control surface movements and resultant damage thereto due to wind. Such small aircraft are not usually so constructed that the instrment panel thereof is contained within an enclosure or cockpit which can be locked against the entry therein of unauthorized persons. Accordingly, the removal and theft of radio and navigational equipment and instrumentation, and also of the control lock and the aircraft itself, has become a matter of major concern to the owners of such small aircraft.

A number of devices have been patented which are directed toward overcoming the problems briefly outlined above. The problem of aircraft theft has been addressed by U.S. Pat. No. 3,898,823, issued to Russel S. Ludeman, Aug. 12, 1975 which discloses a device for locking the controls of an aircraft that includes brackets secured to the pedals and control column wheel interconnected by a tubular housing enclosing a piston like spring device which resiliently locks the wheel and control column against movement when parked, so as to prevent authorized flight of the aircraft. It does not, however, offer any means to cover and prevent theft of the instruments from the instrument panel.

The problem of instrumentation theft has been addressed by U.S. Pat. No. 3,699,787, issued to Ronald F. Corrado, Oct. 24, 1972 which discloses a hollow cover which is mounted over a control column and directly in front of the instrument panel. The cover is locked in place by a tumbler lock which cooperates with a locking device fixed in the instrument panel. While this patent offers protection against theft of the instruments, the practice thereof necessitates the drilling of holes in the instrument panel for the insertion of the locking device. Furthermore, it does not prevent a thief from manipulating the control shaft and connected control wheel to fly the plane away.

Both the aforementioned problems have been addressed by U.S. Pat. No. 4,228,974, issued to August B. Yates, Oct. 21, 1980 which discloses a cover plate mounted immediately adjacent the instrument panel by means of upper and lower clamping blocks secured about the control column in such a manner as to prevent unauthorized movements of the column and access to the instruments on the panel. While such devices have proven successful in the past, the rigid clamps holding the protective panel to the control column causes serious damage thereto should an unauthorized person attempt to pry the protective panel away from the instrument panel.

The foregoing illustrates limitations of the known prior art. Thus, it is apparent that it would be advantageous to provide an alternative to the prior art.

SUMMARY OF THE INVENTION

In one aspect of the present invention this is accomplished by providing a protective device for instruments mounted on an instrument panel having at least one control column extending therefrom, the protective device including a protective cover having at least one open ended aperture formed in the edge thereof for receiving the control column, a shroud connected to the protective cover along the periphery of the open ended aperture for covering a portion of the control column, a bar supported by the shroud so that the shroud and the bar extend about the control column, and means for locking the bar to the shroud in a manner such that no damage will be imparted to the control column in the event the cover is tampered with.

The foregoing and other aspects will become apparent from the following detailed description of the invention when considered in conjunction with the accompanying drawings. It is to be expressly understood however, that the drawings are not intended as a definition of the invention but are for the purpose of illustration only.

BRIEF DESCRIPTION OF THE DRAWINGS

In the drawings:

FIG. 1 is a front elevational view of a protective device constructed in accordance with the present invention and illustrated as installed in an aircraft cockpit;

FIG. 2 is a front elevational view illustrated uninstalled and showing alternate means for lockingly mounting the device on an instrument panel;

FIG. 3 is a side elevational view of the protective device of FIG. 2;

FIG. 4 is a top plan view of the protective device of FIGS. 2 and 3;

FIG. 5 is a side elevational view of the installed protective device of FIG. 1 enlarged to better illustrate the elements thereof;

FIG. 6 is a partial front elevational view of the installed protective device of FIG. 5;

FIG. 7 is an enlarged partial front elevational view of the installed protective device of FIG. 1 illustrating a lock anti-tamper guard secured to the protective device; and FIG. 8 is a top plan view of the lock anti-tamper device of FIG. 7.

DESCRIPTION OF THE PREFERRED EMBODIMENT

Referring now to FIG. 1 of the drawings, an instrument panel protective device constructed in accordance with the teachings of the present invention is designated generally by the numeral 10 and is illustrated installed over an instrument panel 12 in the front of the cockpit of a typical light aircraft. The illustrated cockpit is one for a two place light aircraft having the usual command pilot and copilot instrumentation 14, various control switches 16, and control columns 18, 21 extending from the instrument panel and movable longitudinally forward and backward to operate the elevators and rotatable to the right or to the left by the control wheels 22, 24 respectively to operate the ailerons. A control lock 26 is provided to prevent movement of the various aircraft control surfaces due to wind while the aircraft is parked and includes a lock pin 28 which is inserted through one of the control columns and its associated sheath (not shown) while the aircraft is parked on the ground.

The protective device 10 includes a generally elongate, rectangular protective cover or plate 30 formed of a rigid, lightweight material, for example aluminum, and positioned immediately adjacent the instrument panel 14 which has the basic shape such as illustrated in FIG. 1, but which, in certain instances, may be specifically designed for application to the particular type of instrument panel to which it is to be applied. The protective device further includes means 32 for lockingly mounting the protective cover in a position immediately adjacent the instrument panel. As shown in FIG. 1, and illustrated more clearly in FIGS. 2-4, the locking means includes a pair of open ended apertures 34, 36 formed in the bottom edge 38 of the protective cover 30 which are appropriately spaced to receive the control columns of the aircraft. A pair of shrouds 40, 42 are connected to the protective cover along the peripheries of the open ended apertures 34, 36 respectively and extend outwardly therefrom for covering a portion of each of the control columns.

As illustrated more clearly in FIGS. 2-4, each of the shrouds 40, 42 is of a generally inverted U-shaped configuration and includes a pair of generally vertically extending, spaced apart sidewalls 40a, 40b/42a,42b respectively. The spaced apart walls of each shroud each contain a plurality of successive oppositely disposed and aligned slots 44a, 44b, 44c and 44d, spaced progressively outwardly from the protective cover 30. Each successive slot is positioned progressively horizontally outwardly and vertically upwardly with respect to an inwardly adjacent slot so that the protective device of the present invention may advantageously be fitted into the cockpit of aircraft having control columns of varying diameters.

Referring again to FIG. 1, the protective device 10 of the present invention is secured to each of the control columns 18, 20 by means of a pair of bars 46, 48 which are removably supported by any selective oppositely aligned pair of slots formed in the wall of the shrouds 40, 42 respectively. Each of the bars has an aperture or through bore 50, 52 extending therethrough respectively for receiving a shackle 54, 56 of a respective padlock 58, 60. With the bars locked in the shrouds, each associated shroud and bar cooperate with one another to extend about each control column and lock the protective device thereto, thus preventing access to the instruments mounted on the instrument panel. However, it should be noted that while the protective cover is locked to the steering columns, it is not rigidly clamped thereto so that in the event of unauthorized tampering with the cover, the clearance between the shroud, the bars, and the control columns is such that damage to the control columns will not necessarily result.

Referring to FIG. 2, alternate means for lockingly mounting the protective cover immediately adjacent the instrument panel is illustrated in the form of a single bar 62 which is removably supported by both shrouds 40, 42. A pair of apertures 64, 66 are formed in the bar for receiving the shackles 54, 56 of the padlocks 68, 60 respectively and are spaced apart in a manner such that when the bar is installed in the shroud, each of the locks is positioned within a respective one of the shrouds. In the embodiment shown, the apertures are arranged so as to be positioned offset to one side of the center of the shroud immediately adjacent one of the shroud sidewalls to make tampering with the padlocks and removal thereof more difficult.

Referring now to FIGS. 5 and 6, the control lock 26 for preventing movement of the control column 18 and the controls associated therewith is illustrated in greater detail. The protective device 10 further includes an elongate rod 68 having an eye 70 formed at one end 72 thereof and received over the elongate lock pin portion 28 of the control lock. The other end 74 of the rod is positioned intermediate the shroud 40 and the control column 18 so that when the protective cover 30 is locked in position on the column the control lock 26 may not be removed.

Referring now to FIGS. 7 and 8 one of the padlocks 58 is illustrated with a anti-tamper guard generally designated by the numeral 76 installed thereon. The guard includes a generally rectangularly shaped block 78 having a slot 80 formed therein for receiving the shackle 54 of the padlock. The anti-tamper guard further includes a pair of spaced apart walls 82, 84 extending generally upwardly from a top surface of the block. Each of the walls is positioned generally parellel to and on opposite sides of the slot and includes a transversely extending slot 86, 88 respectively formed therein for receiving the bar 46. With the anti-tamper guard secured in position on the lock, the shackle thereof is rendered relatively inaccessible so that the lock may not be removed by unauthorized personel by means of a saw, bolt cutters and the like.

As illustrated in phantom in FIGS. 1 and 2, one or more optional cover plates 90, 92, 94 may be secured to the bottom edge 38 of the protective cover 30 in any desired preselected location to protect any instruments which may be mounted on the instrument panel in a position below the bottom edge of the protective cover. Moreover, means for providing access to the controls of certain instruments for repair or testing purposes may also be optionally included in the protective device. In the embodiment of FIG. 1, by way of example, the access means is in the form of a recess 96 formed in the bottom edge of the protective cover; however, it is to be understood that the access means may be selectively positioned at any desired location in the protective cover depending upon the particular instrumentation arrangement of the aircraft.

While the present invention has been described with reference to several preferred embodiments, it will be understood by those skilled in the art that various changes may be made and equivalents may be substituted for the elements thereof without departing from the scope of the invention. In addition, many modifications may be made to adapt a particular situation or materials to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A protective device for preventing the theft of instruments from an instrument panel having at least one control column extending therefrom with a lock pin inserted therein to prevent movement thereof comprising:
    a protective cover;
    means for lockingly mounting the protective cover in a position immediately adjacent the instrument panel including:
    at least one open-ended aperture formed in a first edge of the protective cover for receiving the at least one control column;
    a shroud connected to the protective cover along the periphery of the at least one open-ended aperture and extending outwardly therefrom for covering a portion of the at least one control column;
    a bar removably supported by the shroud, the shroud and the bar cooperating to extend about the column;
    means for locking the bar to the shroud; and
    an elongate rod having a first end portion forming an eye adapted to be received on the lock pin and a second end portion positionable intermediate the at least one shroud and control column to prevent removal of the lock pin.

2. The protective device of claim 1 wherein the at least one shroud includes first and second spaced apart walls, each wall having a plurality of slots formed therein; each one of the plurality of slots formed in the first wall being oppositely aligned with a corresponding one of the plurality of slots formed in the second wall, each successive one of the plurality of oppositely aligned slots being positioned progressively horizontally outwardly and vertically upwardly with respect to an inwardly adjacent one of the plurality of slots.

3. The protective device of claim 2 wherein the bar is adapted to be removably supported by any selective oppositely aligned pair of the plurality of slots formed in the first and second walls of the shroud.

4. The protective device of claim 1 wherein the means for locking the bar to the shroud includes an aperture extending through the bar and a padlock having a shackle insertable through the aperture.

5. The protective device of claim 4 further including guard means for preventing tampering with the padlock, the guard means including a generally rectangularly shaped block having a slot formed therein for receiving the shackle of the padlock and a pair of spaced apart walls extending upwardly from a top surface of the block, each of the walls being positioned generally parallel to and on opposite sides of the slot and further having a transversely extending slot formed therein for receiving the bar.

6. The protective device of claim 1 further including access means formed in a preselected position in the protective cover for providing access to the controls of certain instruments.

7. The protective device of claim 1 further including at least one cover plate secured to the protective cover in a preselected location along the first edge thereof to protect instruments positioned below the first edge.

8. The protective device of claim 1 wherein the instrument panel has a second control column extending therefrom and wherein the mounting means further includes:
    a second open-ended aperture formed in the first edge of the protective cover for receiving the second control column;
    a second shroud connected to the protective cover along the periphery of the second open-ended aperture and extending outwardly therefrom for covering a portion of the second control column;
    a second bar removably supported by the second shroud, the second shroud and the second bar cooperating to extend about the second column; and
    means for locking the second bar to the second shroud.

9. The protective device of claim 1 wherein the instrument panel has a second control column extending therefrom and wherein the mounting means further includes:
    a second open-ended aperture formed in the first edge of the protective cover for receiving the second control column;
    a second shroud connected to the protective cover along the periphery of the second open-ended aperture and extending outwardly therefrom for covering a portion of the second control columm, the bar further being removably supported by the second shroud, the second shroud and the bar cooperating to extend about the second column; and
    means for locking the bar to the second shroud.

* * * * *